(12) United States Patent
Bataineh et al.

(10) Patent No.: US 12,328,252 B2
(45) Date of Patent: Jun. 10, 2025

(54) SYSTEM AND METHOD FOR FACILITATING EFFICIENT ADDRESS TRANSLATION IN A NETWORK INTERFACE CONTROLLER (NIC)

(71) Applicant: Hewlett Packard Enterprise Development LP, Spring, TX (US)

(72) Inventors: Abdulla M. Bataineh, Seattle, WA (US); Thomas L. Court, Three Lakes, WI (US); Hess M. Hodge, Seattle, WA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/545,808

(22) Filed: Dec. 19, 2023

(65) Prior Publication Data

US 2024/0121182 A1    Apr. 11, 2024

Related U.S. Application Data

(63) Continuation of application No. 17/594,815, filed as application No. PCT/US2020/024271 on Mar. 23, 2020, now Pat. No. 11,876,702.

(Continued)

(51) Int. Cl.
*G06F 13/16*        (2006.01)
*G06F 9/50*         (2006.01)
(Continued)

(52) U.S. Cl.
CPC .............. *H04L 45/28* (2013.01); *G06F 9/505* (2013.01); *G06F 9/546* (2013.01);
(Continued)

(58) Field of Classification Search
CPC ... H04L 45/28; H04L 1/0083; H04L 43/0876; H04L 43/10; H04L 45/021; H04L 45/028; H04L 45/122; H04L 45/123; H04L 45/125; H04L 45/16; H04L 45/20; H04L 45/24; H04L 45/38; H04L 45/42; H04L 45/46; H04L 45/566; H04L 45/70; H04L 45/745; H04L 45/7453; H04L 47/11; H04L 47/12; H04L 47/122; H04L 47/18; H04L 47/20; H04L 47/22; H04L 47/24; H04L 47/2441; H04L 47/2466; H04L 47/2483; H04L 47/30; H04L 47/32; H04L 47/323; H04L 47/34; H04L 47/39; H04L 47/52;
(Continued)

(56) References Cited

U.S. PATENT DOCUMENTS

2015/0220449 A1 *   8/2015  Stark ................ G06F 21/53
                                                    711/206

* cited by examiner

*Primary Examiner* — Idriss N Alrobaye
*Assistant Examiner* — Richard B Franklin
(74) *Attorney, Agent, or Firm* — Yao Legal Services, Inc.

(57) ABSTRACT

A network interface controller (NIC) capable of facilitating efficient memory address translation is provided. The NIC can be equipped with a host interface, a cache, and an address translation unit (ATU). During operation, the ATU can determine an operating mode. The operating mode can indicate whether the ATU is to perform a memory address translation at the NIC. The ATU can then determine whether a memory address indicated in the memory access request is available in the cache. If the memory address is not available in the cache, the ATU can perform an operation on the memory address based on the operating mode.

20 Claims, 7 Drawing Sheets

Related U.S. Application Data

(60) Provisional application No. 62/852,289, filed on May 23, 2019, provisional application No. 62/852,203, filed on May 23, 2019, provisional application No. 62/852,273, filed on May 23, 2019.

(51) Int. Cl.

| | |
|---|---|
| G06F 9/54 | (2006.01) |
| G06F 12/0862 | (2016.01) |
| G06F 12/1036 | (2016.01) |
| G06F 12/1045 | (2016.01) |
| G06F 13/14 | (2006.01) |
| G06F 13/28 | (2006.01) |
| G06F 13/38 | (2006.01) |
| G06F 13/40 | (2006.01) |
| G06F 13/42 | (2006.01) |
| G06F 15/173 | (2006.01) |
| H04L 1/00 | (2006.01) |
| H04L 43/0876 | (2022.01) |
| H04L 43/10 | (2022.01) |
| H04L 45/00 | (2022.01) |
| H04L 45/02 | (2022.01) |
| H04L 45/021 | (2022.01) |
| H04L 45/028 | (2022.01) |
| H04L 45/12 | (2022.01) |
| H04L 45/122 | (2022.01) |
| H04L 45/125 | (2022.01) |
| H04L 45/16 | (2022.01) |
| H04L 45/24 | (2022.01) |
| H04L 45/28 | (2022.01) |
| H04L 45/42 | (2022.01) |
| H04L 45/745 | (2022.01) |
| H04L 45/7453 | (2022.01) |
| H04L 47/10 | (2022.01) |
| H04L 47/11 | (2022.01) |
| H04L 47/12 | (2022.01) |
| H04L 47/122 | (2022.01) |
| H04L 47/20 | (2022.01) |
| H04L 47/22 | (2022.01) |
| H04L 47/24 | (2022.01) |
| H04L 47/2441 | (2022.01) |
| H04L 47/2466 | (2022.01) |
| H04L 47/2483 | (2022.01) |
| H04L 47/30 | (2022.01) |
| H04L 47/32 | (2022.01) |
| H04L 47/34 | (2022.01) |
| H04L 47/52 | (2022.01) |
| H04L 47/62 | (2022.01) |
| H04L 47/625 | (2022.01) |
| H04L 47/6275 | (2022.01) |
| H04L 47/629 | (2022.01) |
| H04L 47/76 | (2022.01) |
| H04L 47/762 | (2022.01) |
| H04L 47/78 | (2022.01) |
| H04L 47/80 | (2022.01) |
| H04L 49/00 | (2022.01) |
| H04L 49/101 | (2022.01) |
| H04L 49/15 | (2022.01) |
| H04L 49/90 | (2022.01) |
| H04L 49/9005 | (2022.01) |
| H04L 49/9047 | (2022.01) |
| H04L 67/1097 | (2022.01) |
| H04L 69/22 | (2022.01) |
| H04L 69/40 | (2022.01) |
| H04L 69/28 | (2022.01) |

(52) U.S. Cl.
CPC ...... *G06F 12/0862* (2013.01); *G06F 12/1036* (2013.01); *G06F 12/1063* (2013.01); *G06F 13/14* (2013.01); *G06F 13/16* (2013.01); *G06F 13/1642* (2013.01); *G06F 13/1673* (2013.01); *G06F 13/1689* (2013.01); *G06F 13/28* (2013.01); *G06F 13/385* (2013.01); *G06F 13/4022* (2013.01); *G06F 13/4068* (2013.01); *G06F 13/4221* (2013.01); *G06F 15/17331* (2013.01); *H04L 1/0083* (2013.01); *H04L 43/0876* (2013.01); *H04L 43/10* (2013.01); *H04L 45/02* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 45/7453* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/6235* (2013.01); *H04L 47/626* (2013.01); *H04L 47/6275* (2013.01); *H04L 47/629* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 2212/50* (2013.01); *G06F 2213/0026* (2013.01); *G06F 2213/3808* (2013.01); *H04L 69/28* (2013.01)

(58) Field of Classification Search
CPC . H04L 47/621; H04L 47/6235; H04L 47/626; H04L 47/6275; H04L 47/76; H04L 47/762; H04L 47/781; H04L 47/80; H04L 49/101; H04L 49/15; H04L 49/30; H04L 49/3009; H04L 49/3018; H04L 49/3027; H04L 49/90; H04L 49/9005; H04L 49/9021; H04L 49/9036; H04L 49/9047; H04L 67/1097; H04L 69/22; H04L 69/40; H04L 69/28; G06F 9/505; G06F 9/546; G06F 12/0862; G06F 12/1036; G06F 12/1063; G06F 13/14; G06F 13/16; G06F 13/1642; G06F 13/1673; G06F 13/1689; G06F 13/385; G06F 13/4022; G06F 13/4068; G06F 13/4221; G06F 15/17331; G06F 2212/50; G06F 2213/0026; G06F 2213/3808

See application file for complete search history.

SYSTEM AND METHOD FOR FACILITATING EFFICIENT ADDRESS TRANSLATION IN A NETWORK INTERFACE CONTROLLER (NIC)

CROSS REFERENCE TO RELATED APPLICATIONS

This application is a continuation of U.S. patent application Ser. No. 17/594,815, filed on Oct. 29, 2021, which application is a national stage of International Application No. PCT/US2020/024271, filed on Mar. 23, 2020, which claims the benefit of U.S. Provisional Application No. 62/852,203 filed on May 23, 2019, U.S. Provisional Application No. 62/852,273 filed on May 23, 2019 and U.S. Provisional Application No. 62/852,289 filed May 23, 2019. The disclosures of the aforementioned applications are hereby incorporated by reference in their entireties.

BACKGROUND

Field

This is generally related to the technical field of networking. More specifically, this disclosure is related to systems and methods for facilitating a network interface controller (NIC) with efficient address translation management.

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (IOT) can generate different types of traffic with distinctive characteristics. As a result, in addition to conventional network performance metrics such as bandwidth and delay, network architects continue to face challenges such as scalability, versatility, and efficiency.

SUMMARY

A network interface controller (NIC) capable of facilitating efficient memory address translation is provided. The NIC can be equipped with a host interface, a cache, and an address translation unit (ATU). During operation, the ATU can determine an operating mode. The operating mode can indicate whether the ATU is to perform a memory address translation at the NIC. The ATU can then determine whether a memory address indicated in the memory access request is available in the cache. If the memory address is not available in the cache, the ATU can perform an operation on the memory address based on the operating mode.

BRIEF DESCRIPTION OF THE FIGURES

In the figures, like reference numerals refer to the same figure elements.

DETAILED DESCRIPTION

Figure 1:
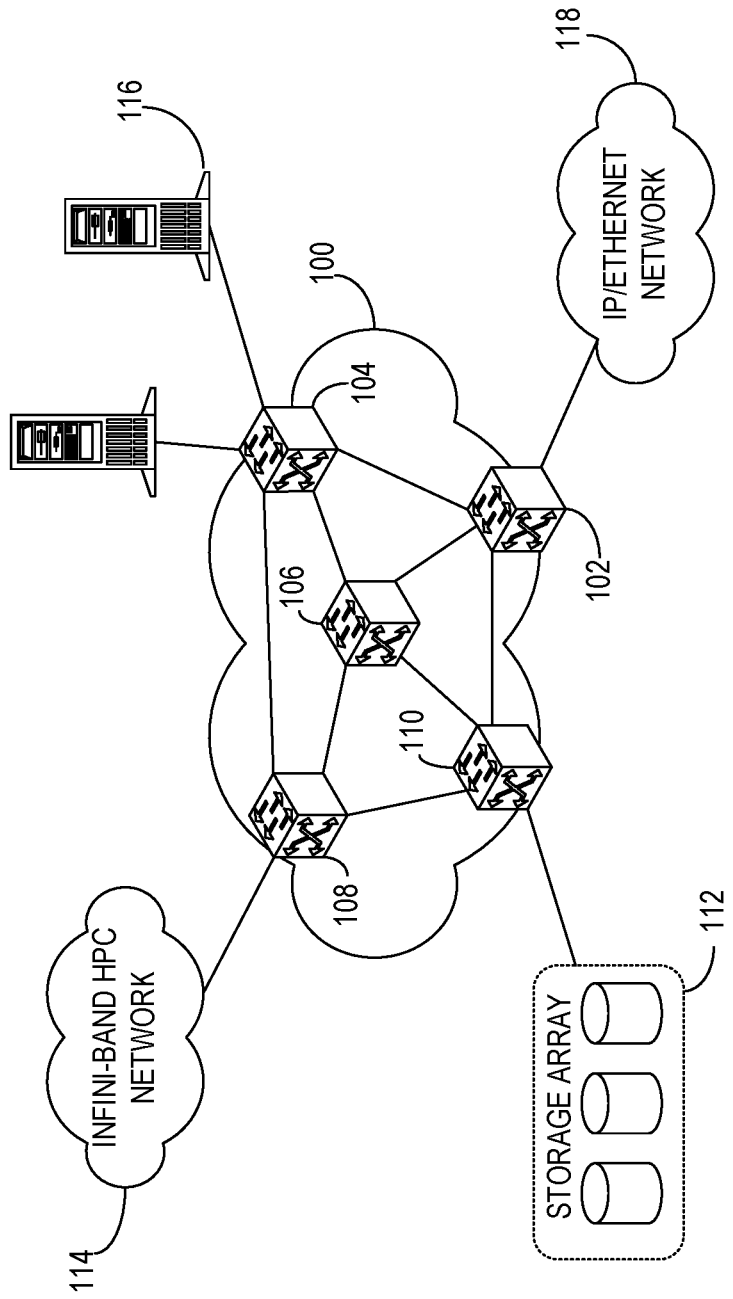
FIG. 1 shows an exemplary network.

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Overview

The present disclosure describes systems and methods that facilitate efficient address translation in a network interface controller (NIC). The NIC allows a host to communicate with a data-driven network. The network can accommodate dynamic data traffic with fast, effective congestion control by maintaining state information of individual packet streams. More specifically, packets injected into the network of switches can be categorized into streams, which can be mapped to their layer-2, layer-3, or other protocol-specific header information. Each stream can be marked by a distinctive identifier that is local to an input port of a switch, and provided with a stream-specific input buffer so that each stream can be individually flow-controlled. In addition, packets of a respective stream can be acknowledged upon reaching the egress point of the network, and the acknowledgment packets can be sent back to the ingress point of the stream along the same data path in the reverse direction. As a result, each switch can obtain state information of active packet streams it is forwarding and can perform highly responsive, stream-specific flow control. Such flow control can allow the network to operate at higher capacity while providing versatile traffic-engineering capabilities.

The embodiments described herein solve the problem of inefficient address translation caused by unused pre-fetched translation by (i) dynamically allocating an address translation mode based on the current load on the address translation process, and (ii) based on the mode, switching between local and host-based address translation processes.

During operation, an application, which may run on a host computing device of a NIC, can generate a data operation (e.g., a "GET" or a "PUT" command of remote direct memory access (RDMA)) for a memory location of a remote device. The operation may represent the remote memory location using a virtual address. The operation, such as a read or a write, is usually performed on data at the location indicated by the virtual address. Such a remote memory reference can require an address translation from the virtual address to a physical address of the remote device.

When an application performs operations on a memory location, the operations are often directed to sequential memory locations. For example, when an operation of the application accesses a memory location, subsequent operations may access adjacent memory locations. As a result, the operations may move sequentially in memory. To utilize this feature, the address translation process can pre-fetch address translations for the adjacent memory locations. However, some applications may not access memory locations sequentially. For such circumstances, pre-fetching the address translations can cause inefficient bandwidth utilization of a host interface. For instance, if the NIC is coupled to the host via a peripheral component interconnect express (PCIe) interface, unused pre-fetching may lead to inefficient utilization of the PCIe bandwidth.

To solve this problem, the NIC can be equipped with an address translation unit (ATU) that may bypass pre-fetching of address translations upon meeting one or more criteria. The criteria can include one or more of: a combination (e.g., a summation) of a number of the outstanding address translation requests and a number of outstanding interface read requests being greater than an interface high watermark, and the number of the outstanding address translation requests being greater than an ATU high watermark. The ATU, thus, can prevent inefficient bandwidth utilization of the host interface. Typically, the ATU can operate in a "regular" mode that allows the ATU to pre-fetch address translations for a number of addresses in addition to a current address of interest. The ATU may select the addresses to pre-fetch based on a selection policy. Examples of the selection policy can include, but are not limited to, adjacent address selection, statistical or empirical data-based selection, and hotspot based selection.

The ATU can also operate based on a "bypass" mode that causes the ATU to refrain from performing address translation and defer the address translation to the host device (e.g., the processor of the host device). Upon receiving an address translation request from the application, the ATU can return the address back to the application without providing the translation. The ATU can include an indicator that indicates that the address has not been translated (e.g., by setting the address type to un-translated in the return message). The NIC can dynamically switch between the two modes.

In some embodiments, the NIC can determine when to switch between the two modes based on two sets of watermarks. The first set of watermarks can include a low watermark and a high watermark for a number of outstanding address translation requests. The second set of watermarks can include a high watermark for the total number of outstanding interface read requests (e.g., the PCIe read requests reported by the host interface). If the number of outstanding address translation requests falls below the low watermark, the NIC can switch to the regular mode. On the other hand, if a combination of the number of outstanding address translation requests and the total number of outstanding interface read requests crosses the interface high watermark, and the number of outstanding address translation requests crosses the address translation high watermark, the NIC can switch to the bypass mode. In this way, the NIC can determine whether the current translation requests are sequential requests and switch between the modes accordingly.

One embodiment of the present invention provides a NIC that can be equipped with a host interface, a cache, and an address translation unit (ATU). During operation, the ATU can determine an operating mode. The operating mode can indicate whether the ATU is to perform a memory address translation at the NIC. The ATU can then determine whether a memory address indicated in the memory access request is available in the cache. If the memory address is not available in the cache, the ATU can perform an operation on the memory address based on the operating mode.

In a variation on this embodiment, the operating mode is one of: (i) a regular mode that can cause the ATU to perform the memory address translation of the memory address, and (ii) a bypass mode that can cause the ATU to defer to the host device for the memory address translation of the memory address.

In a further variation, if the ATU is in the regular mode, the ATU can generate an address translation request for the memory address translation of the memory address and send the address translation request to an address translation service via the host interface.

In a further variation, the ATU can determine a set of additional memory addresses for pre-fetching based on the memory address, and incorporate the memory address and the set of additional memory addresses into the address translation request.

In a further variation, if the ATU is in the bypass mode, the ATU can send the memory address and an indicator via the host interface. The indicator can indicate that the memory address has not been translated.

In a further variation, the ATU can set the operating mode to the regular mode in response to a number of outstanding address translation requests being below a low watermark.

In a further variation, the ATU is to set the operating mode to the bypass mode in response to one or more of: (i) a combination of a number of outstanding address translation requests and a number of outstanding interface read requests being above a first high watermark, and (ii) the number of outstanding interface read requests being above a second high watermark.

In a further variation, the ATU can obtain the number of outstanding interface read requests from the host interface.

In a variation on this embodiment, the memory access request is a remote direct memory access (RDMA) command.

In a variation on this embodiment, the memory address can be a virtual memory address. The memory address translation can then provide a translation between the virtual memory address and a physical memory address.

Figure 2A:
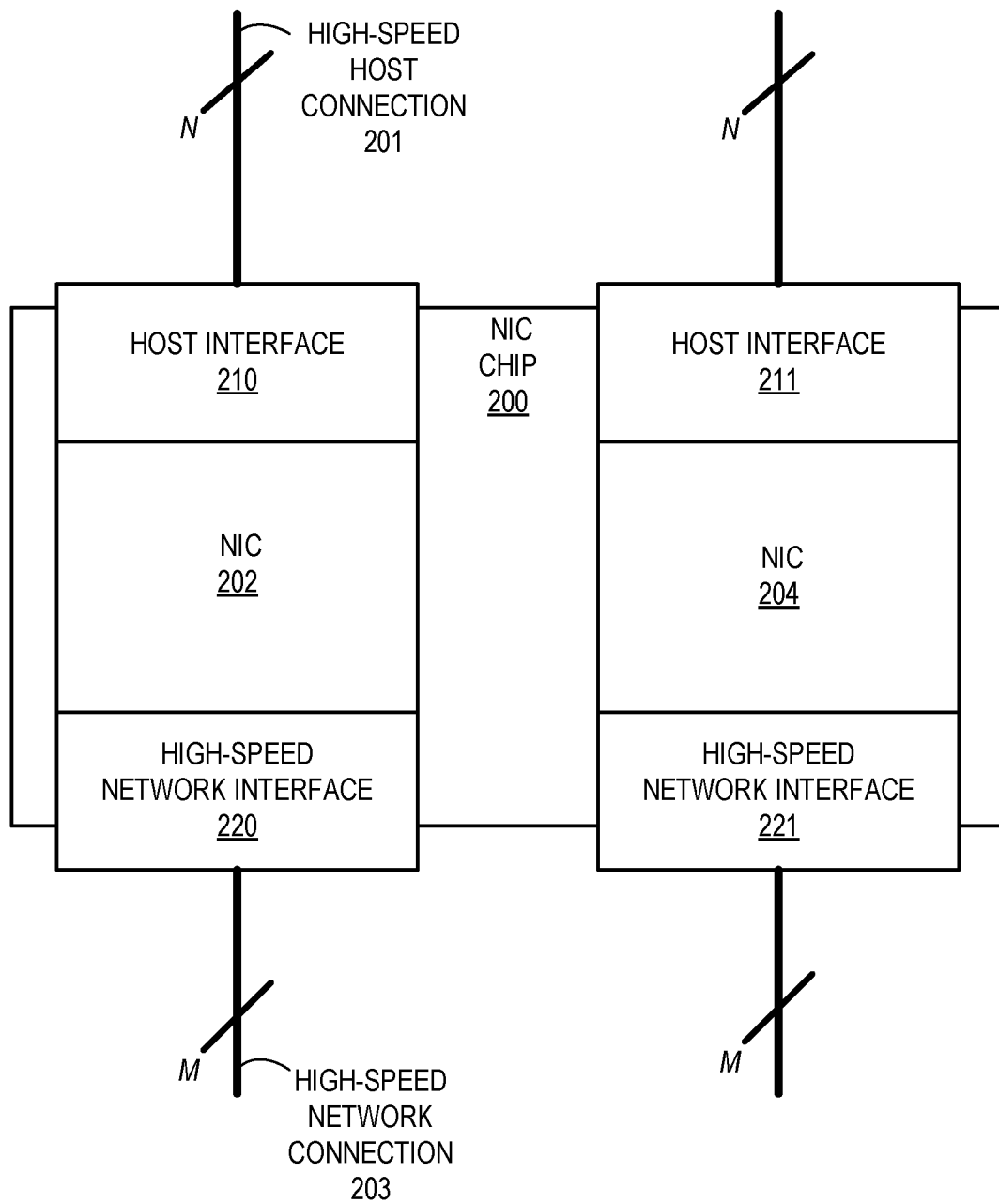
FIG. 2A shows an exemplary NIC chip with a plurality of NICs.

In this disclosure, the description in conjunction with FIG. 1 is associated with a network architecture and the description in conjunction with FIG. 2A and onward provide more details on the architecture and operations associated with a NIC that supports efficient memory address translation.

In this disclosure, packet streams can also be referred to as "packet flows," or simply "flows." The data path traversed by a flow, together with its configuration information maintained by switches, can be referred to as a "flow channel." Furthermore, the terms "buffer" and "queue" are used interchangeably in this disclosure.

FIG. 1 shows an exemplary network that facilitates flow channels. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link Typically, traffic can be injected into switch fabric 100 via an ingress port of an edge switch, and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one High-speed Network Interface (HNI) for communicating with a link coupled to switch fabric 100 of FIG. 1. For example, NIC 202 can include an HI 210 and an HNI 220, and NIC 204 can include an HI 211 and an HNI 221.

In some embodiments, HI 210 can be a peripheral component interconnect (PCI) or a peripheral component interconnect express (PCIe) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on Message Passing Interface (MPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and Atomic Memory Operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the driver software, thereby ensuring flexibility in NIC 202.

Furthermore, NIC 202 can facilitate triggered operations, a general-purpose mechanism for offloading, and progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
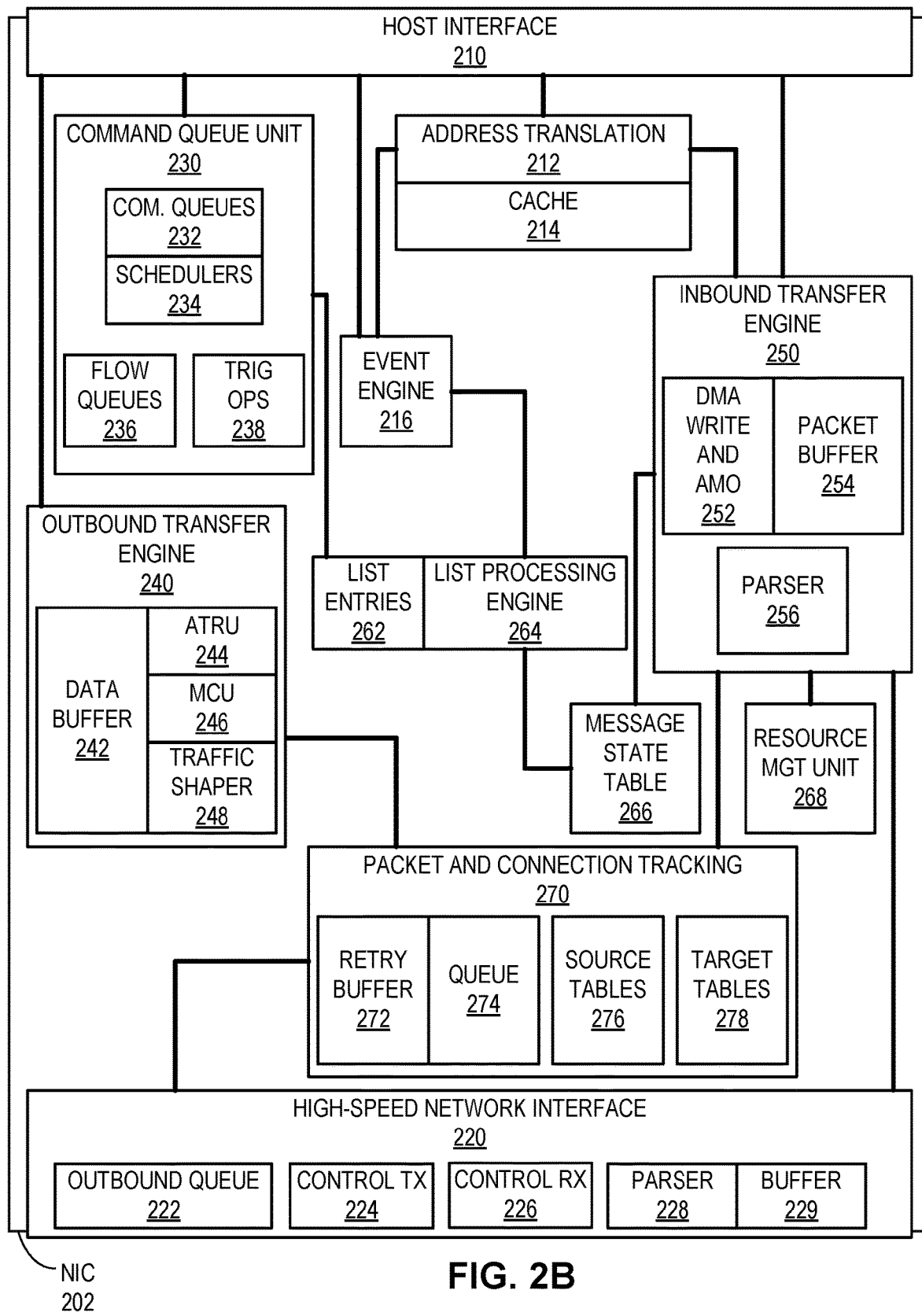
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a Command Queue (CQ) unit 230. CQ unit 230 can be responsible for fetching and issuing host side commands CQ unit 230 can include command queues 232 and schedulers 234. Command queues 232 can include two independent sets of queues for initiator commands (PUT, GET, etc.) and target commands (Append, Search, etc.), respectively. Command queues 232 can be implemented as circular buffers maintained in the memory of NIC 202. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module (or logic block) 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE) 250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The received data can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be stored in retry buffer 272. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a List Processing Engine (LPE) 264 or a Message State Table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET response), the packet can be passed to the OXE 240. NIC 202 can also include an EE 216, which can receive requests to generate event notifications from other modules or units in NIC 202. An event notification can specify that either a fill event or a counting event is generated. EE 216 can manage event queues, located within host processor memory, to which it writes full events. EE 216 can forward counting events to CQ unit 230.

Address Translation in NIC

Figure 3:
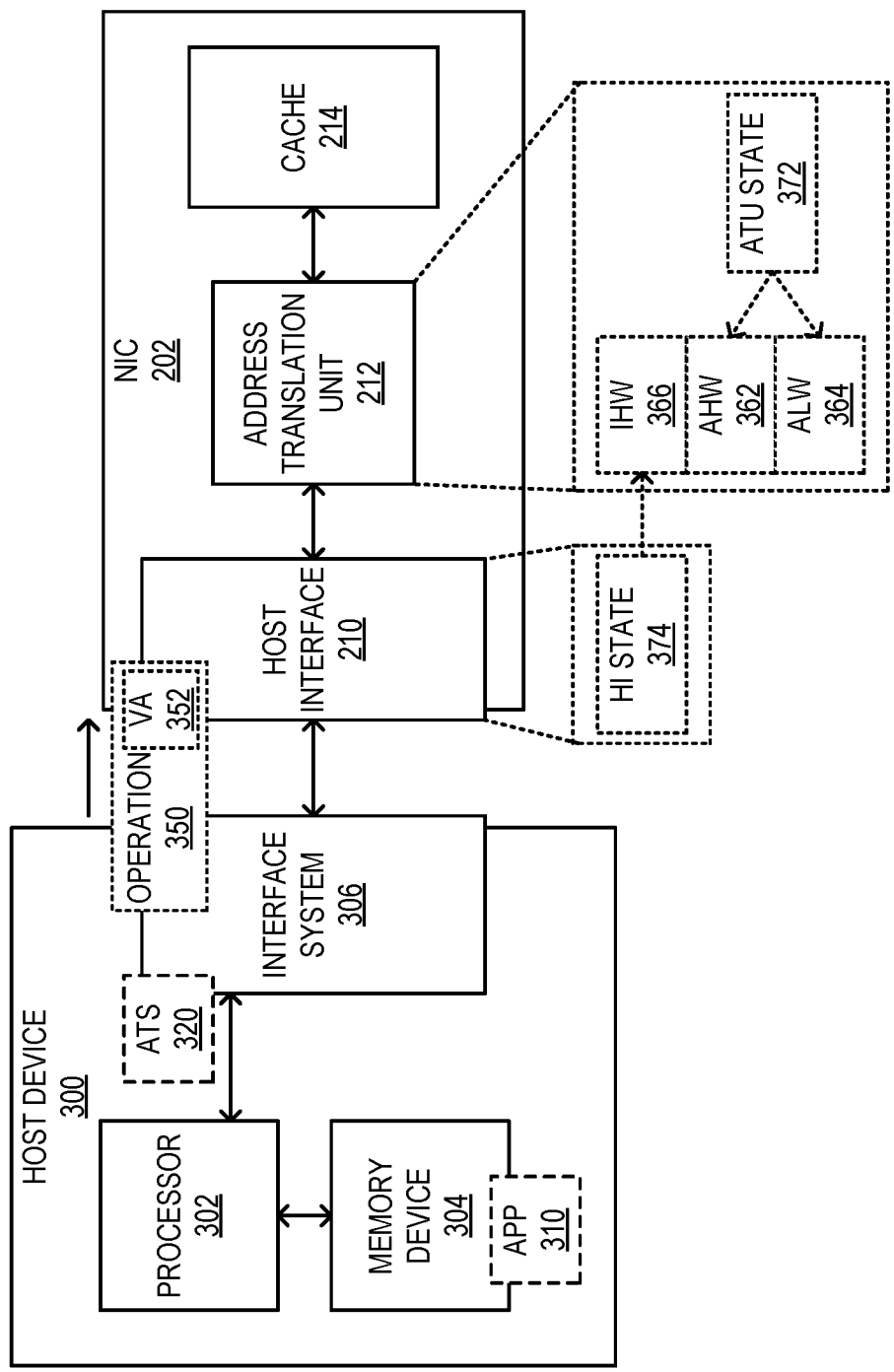
FIG. 3 shows exemplary efficient address translation in a NIC.

FIG. 3 shows exemplary efficient address translation in a NIC. In this example, NIC 202 can be coupled to a host device 300 via HI 210. Host device 300 can include a processor 302, a memory device 304, and an interface system 306. For example, if HI 210 is a PCIe interface, interface system 306 can be a PCIe system that provides a slot for HI 210. An application 310 can run on host device 300. During operation, application 310 can issue a memory access operation 350 for a virtual address 352. NIC 202 may expect that the subsequent requests from application 310 would be directed to sequential memory locations with respect to virtual address 352. To utilize this feature, ATU 212 can pre-fetch address translations for virtual address 352 as well as adjacent memory locations of virtual address 352. ATU 212 can then store the address translations in cache 214. However, if application 310 does not access memory locations sequentially, pre-fetching the address translations can cause inefficient bandwidth utilization of HI 210 (e.g., inefficient utilization of the PCIe bandwidth facilitated by interface connector 306).

To solve this problem, ATU 212 may bypass pre-fetching of address translations, if needed. Typically, ATU 212 can operate in a "regular" mode that allows ATU 212 to pre-fetch address translations for a number of addresses in addition to the current address of interest (i.e., virtual address 352). ATU 212 may select the addresses to pre-fetch based on a selection policy. Examples of the selection policy can include, but are not limited to, adjacent address selection (e.g., the addresses adjacent to virtual address 352), statistical or empirical data-based selection (e.g., the addresses typically accessed after accessing virtual address 352), and hotspot based selection (e.g., the most frequently accessed addresses close to virtual address 352).

In the regular mode, ATU 212 can obtain translations using address translation services (ATS) 320. ATS 320 can be a PCIe extension that allows NIC 202 to interact with an address translation agent in or above the root complex of interface system 306. Upon detecting a cache miss for virtual address 352 (i.e., a translation for virtual address 352 is not present in cache 214), ATU 212 can generate an ATS translation request and send the request via HI 210 to processor 302 to obtain the requested translation. Since the regular mode allows pre-fetching, ATU 212 can include translation requests for N addresses. This allows ATU 212 to fill the ATU cache line with the translation for virtual address 352 as well as (N−1) adjacent addresses that may become useful. For example, if the value of N is 8, ATU 212 can request address translation for virtual address 352 and 7 following addresses.

ATU 212 can also operate based on a "bypass" mode that allows ATU 212 to refrain from performing address translation and defer the address translation to host device 300. If ATU 212 is in the bypass mode, when NIC 202 receives operation 350, ATU 212 can return virtual address 352 back to application 310 without providing the translation. ATU 212 can include an indicator that indicates that virtual address 352 has not been translated. For example, ATU 212 can set the address type to un-translated (e.g., to a DEFAULT_UNTRANS type) in the return message. The bypass mode allows ATU 212 to operate without pre-fetching of address translations, thereby avoiding inefficient utilization of the bandwidth of HI 210.

To facilitate efficient address translation, NIC 202 can dynamically switch between the two modes. NIC 202 can determine when to switch between the modes based on two sets of watermarks. The first set of watermarks can include an ATU high watermark (AHW) 362 and an ATU low watermark (ALW) 364 for a number of outstanding address translation requests. The second set of watermarks can include an interface high watermark (IHW) 366 for the total number of outstanding interface read requests (e.g., PCIe read requests) reported by HI 210. In some embodiments, NIC 202 maintains the values of AHW 362, ALW 364, and IHW 366 in respective control and status register (CSR).

ATU 212 can determine an ATU state 372 indicating the number of outstanding address translation requests. ATU 212 can, for example, count of the total number of outstanding interface request from the ATU 212 to HI 210 to determine ATU state 372. HI 210 can maintain an HI state 374 indicating the total number of outstanding interface read requests. ATU 212 can obtain HI state 374 from HI 210. If ATU state 372 falls below ALW 364, NIC 202 can switch to the regular mode. On the other hand, if a combination of ATU state 372 and HI state 374 crosses IHW 366, and ATU state 372 crosses ATU state 372, NIC 202 can switch to the bypass mode. To make the switching decision, ATU 212 can compare ATU state 372 with AHW 362 and ALW 364 stored in the respective CSRs. Similarly, ATU 212 can compare HI state 374 with IHW 366 stored in the corresponding CSR.

Figure 4A:
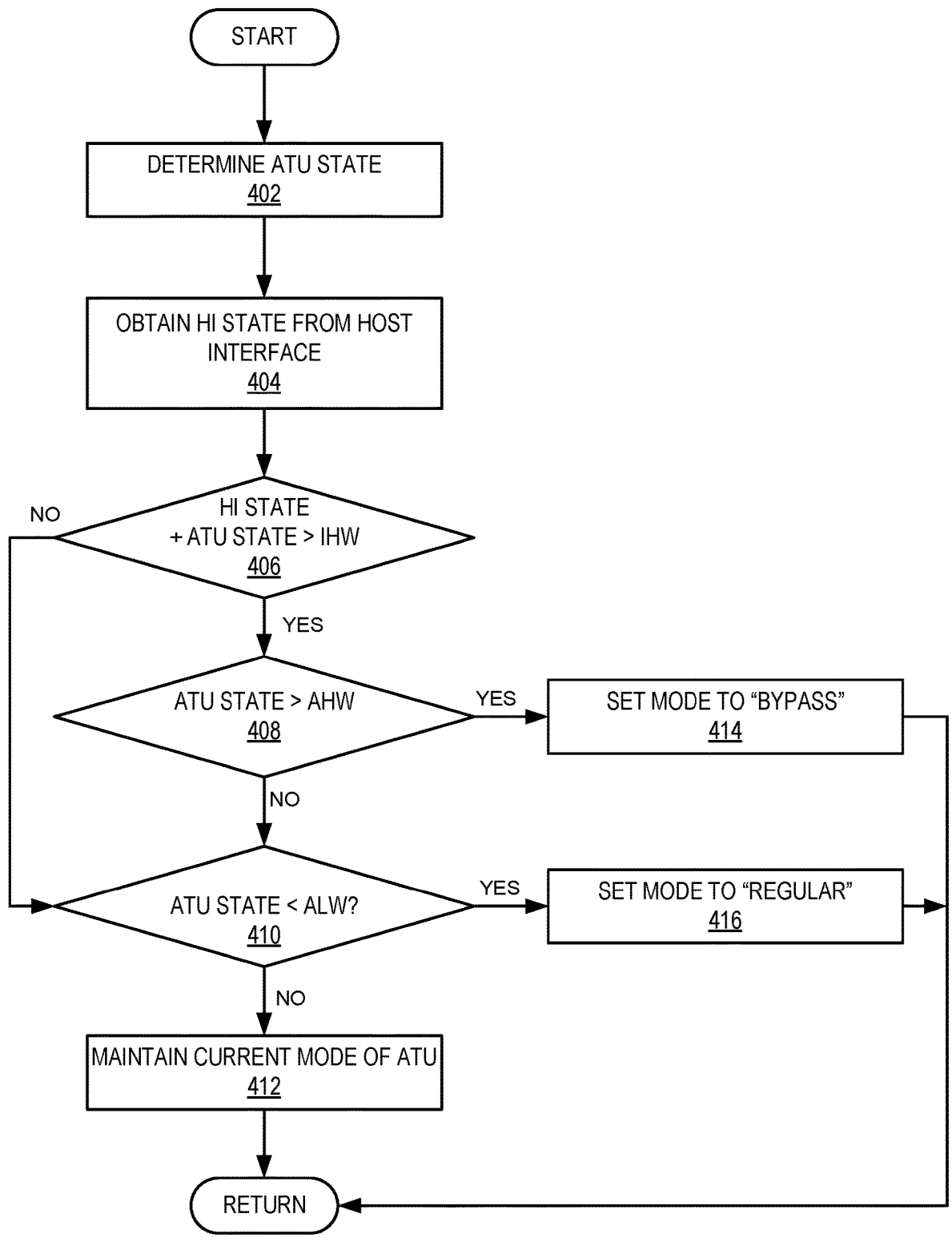
FIG. 4A shows a flow chart of an exemplary mode setting process for address translation in a NIC.

FIG. 4A shows a flow chart of an exemplary mode setting process for address translation in a NIC. During operation, an ATU of the NIC can determine the ATU state (operation 402) and obtain the HI state from the host interface (operation 404). The ATU can then determine whether a combination, such as a summation, of the HI state and the ATU state is above the IHW (operation 406). If the states are above the IHW, ATU can determine whether the ATU state is above the AHW (operation 408). If the ATU state is above the AHW, the ATU can set the mode as "bypass" (operation 414). If the states are not above the IHW (operation 406) or the ATU state is not above the AHW (operation 408), the ATU can determine whether the ATU state is below the ALW (operation 410). If the ATU state is below the ALW, the ATU can set the mode as "regular" (operation 416). If the ATU state is below the ALW (operation 410), the ATU can maintain the current mode of the ATU (operation 412).

Figure 4B:
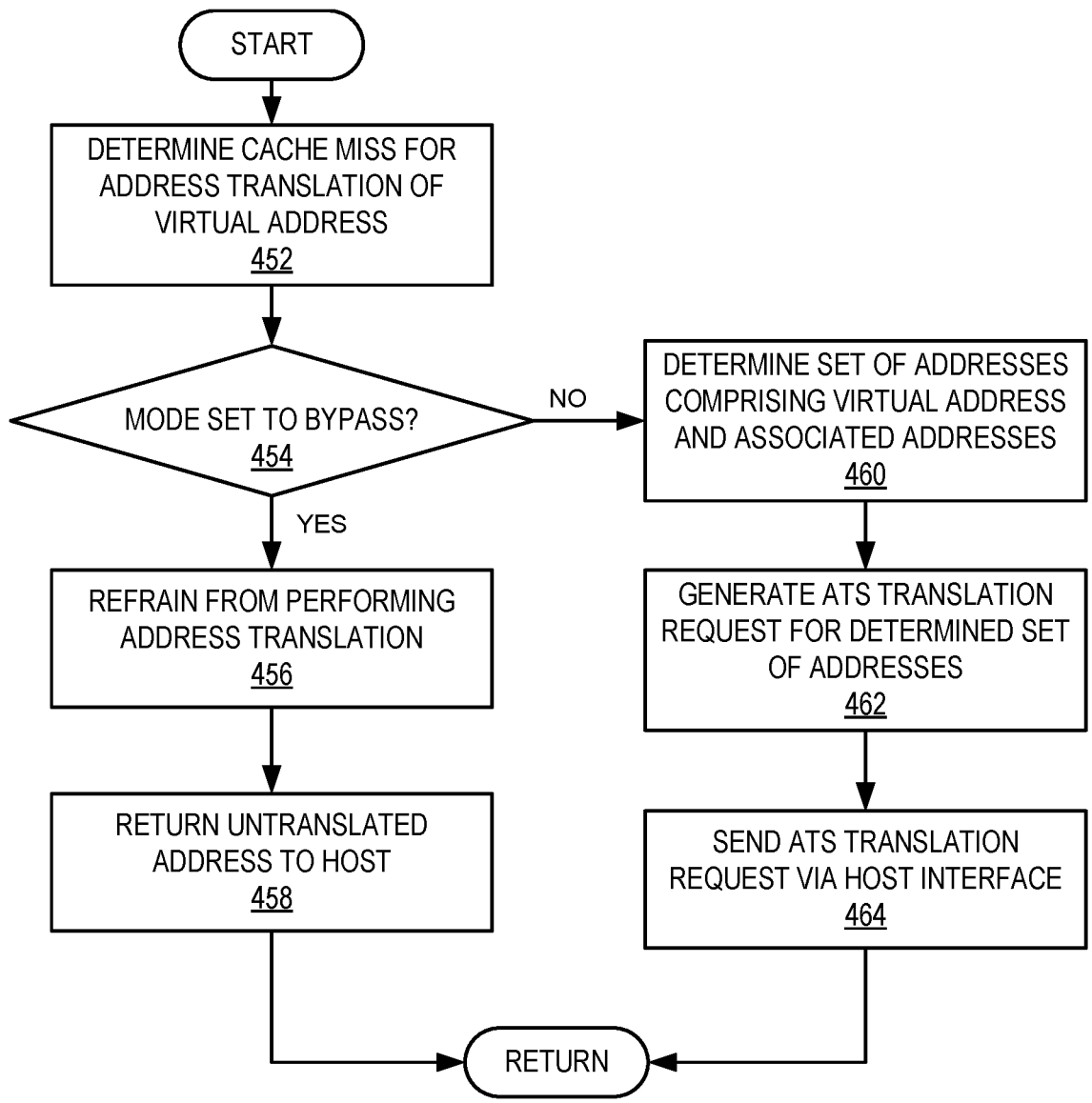
FIG. 4B shows a flow chart of an exemplary address translation process in a NIC.

FIG. 4B shows a flow chart of an exemplary address translation process in a NIC. During operation, an ATU of the NIC can determine a cache miss for the address translation of a virtual address (operation 452). The virtual address can be for a memory access request from a host. The ATU can then determine whether a mode of the ATU is set to bypass (operation 454). If the mode is set to bypass, the ATU can refrain from performing an address translation (operation 456) and return the untranslated address to the host (operation 458). On the other hand, if the mode is not set to bypass, the mode can be set to regular. Consequently, the ATU can determine a set of addresses comprising the virtual and a number of associated addresses (e.g., sequential addresses) (operation 460). The ATU can then generate an ATS translation request for the determined set of addresses (operation 462) and send the ATS translation request via the host interface (operation 464).

Exemplary Computer System

Figure 5:
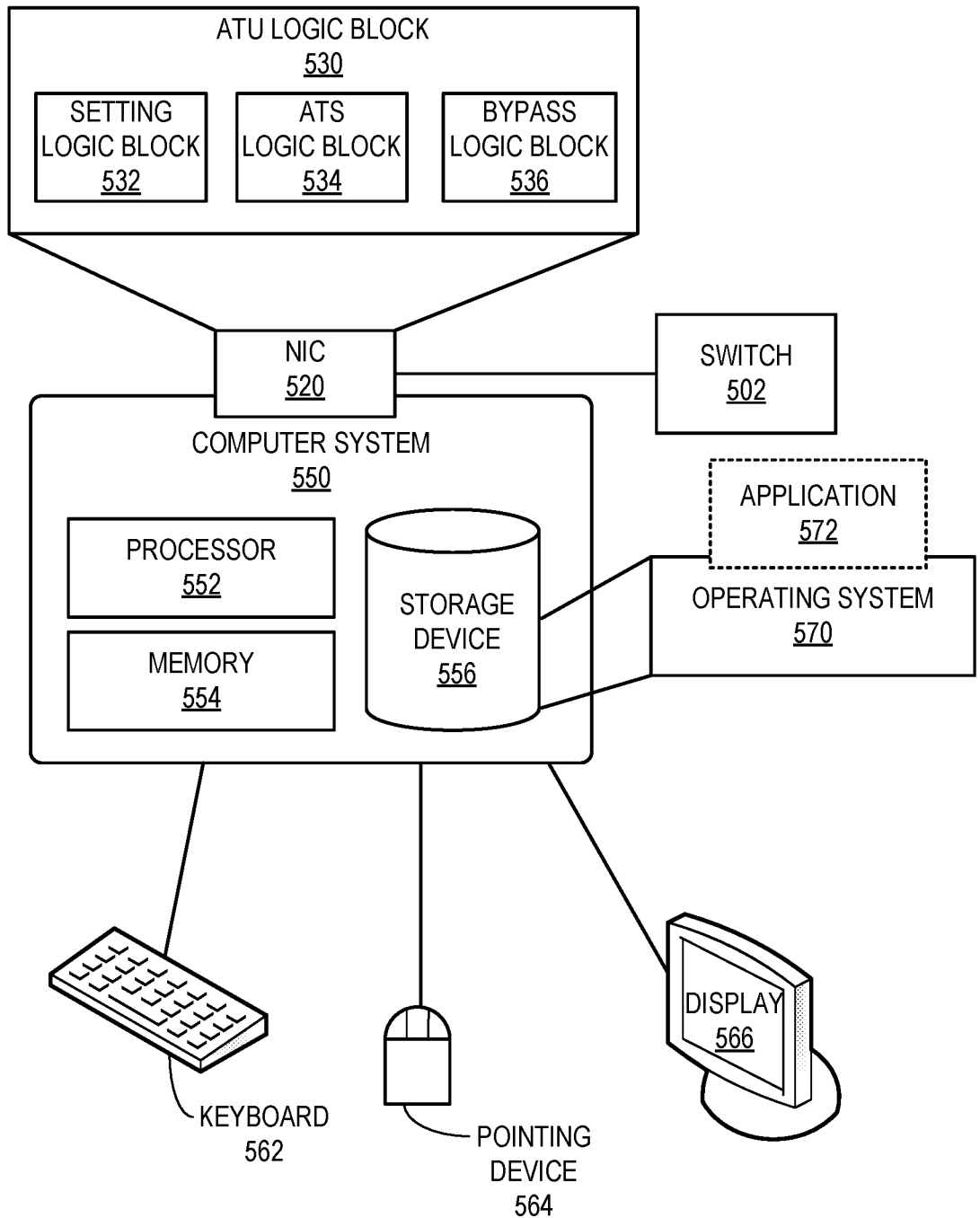
FIG. 5 shows an exemplary computer system equipped with a NIC that facilitates efficient address translation.

FIG. 5 shows an exemplary computer system equipped with a NIC that facilitates efficient address translation. Computer system 550 includes a processor 552, a memory device 554, and a storage device 556. Memory device 554 can include a volatile memory device (e.g., a dual in-line memory module (DIMM)). Furthermore, computer system 550 can be coupled to a keyboard 562, a pointing device 564, and a display device 566. Storage device 556 can store an operating system 570. An application 572 can operate on operating system 570.

Computer system 550 can be equipped with a host interface coupling a NIC 520 that facilitates efficient data request management. NIC 520 can provide one or more HNIs to computer system 550. NIC 520 can be coupled to a switch 502 via one of the HNIs. NIC 520 can include an ATU logic block 530, as described in conjunction with FIGS. 2B and 3. ATU logic block 530 can include a setting logic block 532 that can determine the mode for ATU logic block 530. ATU logic block 530 can also include an ATS logic block 534 that can facilitate address translation when ATU 530 is in the regular mode. ATS logic block 534 can send an address translation request for an address of interest and a set of pre-fetch addresses to an ATS service of computer system 550. The address of interest can be a virtual address indicated in a memory access request from application 572. On the other hand, bypass logic block 536 of ATU logic block 530 operates when ATU 530 is in the bypass mode. Bypass logic block 536 can send back an address of interest without performing the translation via the host interface.

In summary, the present disclosure describes a NIC that facilitates efficient memory address translation. The NIC can be equipped with a host interface, a cache, and an address translation unit (ATU). During operation, the ATU can determine an operating mode. The operating mode can indicate whether the ATU is to perform a memory address translation at the NIC. The ATU can then determine whether a memory address indicated in the memory access request is available in the cache. If the memory address is not available in the cache, the ATU can perform an operation on the memory address based on the operating mode.

The methods and processes described above can be performed by hardware logic blocks, modules, logic blocks, or apparatus. The hardware logic blocks, modules, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
   determining, by an address translation unit, a first number of outstanding address translation requests;
   obtaining, by the address translation unit, a second number of outstanding read requests tracked by a host interface of a network interface controller (NIC);
   setting an operating mode of the address translation unit to a bypass mode based on a comparison of the first and second numbers with a first threshold and a second threshold; and
   in response to receiving a memory access request while the bypass mode is set:
      refraining from performing address translation for the memory access request; and
      returning an untranslated address to a host device via the host interface.

2. The method of claim 1,
   wherein the comparison comprises a summation of the first and second numbers being greater than the first threshold and the first number being greater than the second threshold.

3. The method of claim 1, further comprising:
   setting the operating mode of the address translation unit to a regular mode in response to the first number being greater than the second threshold and less than a third threshold.

4. The method of claim 3,
   wherein the first threshold comprises an interface high watermark,
   wherein the second threshold comprises an ATU high watermark, and
   wherein the third threshold comprises an ATU low watermark.

5. The method of claim 3, further comprising:
   receiving the memory access request while the regular mode is set; and
   performing the address translation for a virtual address associated with the memory access request.

6. The method of claim 5, wherein performing the address translation for the virtual address associated with the memory access request comprises:

determining a set of addresses associated with the virtual address based on a selection policy;
pre-fetching address translations for the associated addresses by generating an address translation request for at least the virtual address and the associated addresses; and
sending the generated address translation request to the host device.

7. The method of claim 6, wherein the selection policy is based on at least one of:
addresses which are adjacent to the virtual address;
historical data which indicates addresses typically accessed after accessing the virtual address; or
most frequently accessed addresses which are within a number of bytes from the virtual address.

8. The method of claim 1, wherein returning the untranslated address to the host device comprises:
sending, to an address translation service of the host device, a request to perform the address translation for the memory access request.

9. A network interface controller (NIC), comprising:
a host interface for communicating with a host device;
a cache for storing resolved memory address translations; and
an address translation unit (ATU) to:
determine a first number of outstanding address translation requests;
obtain a second number of outstanding read requests tracked by the host interface;
set an operating mode of the address translation unit to a bypass mode based on a summation of the first and second numbers being greater than a first threshold and the first number being greater than a second threshold; and
in response to receiving a memory access request while the bypass mode is set:
refrain from performing address translation for the memory access request; and
return an untranslated address to a host device via the host interface.

10. The network interface controller of claim 9, the ATU further to:
determine that the first number is greater than the second threshold and less than a third threshold; and
set the operating mode of the address translation unit to a regular mode.

11. The network interface controller of claim 10, the ATU further to:
receive the memory access request while the regular mode is set; and
perform the address translation for a virtual address associated with the memory access request by:
determining a set of addresses associated with the virtual address based on a selection policy;
pre-fetching address translations for the associated addresses by generating an address translation request for at least the virtual address and the associated addresses; and
sending the generated address translation request to an address translation service of the host device.

12. The network interface controller of claim 9,
wherein the first threshold comprises a high watermark associated with the host interface,
wherein the second threshold comprise a high watermark associated with the ATU, and
wherein the third threshold comprises a low watermark associated with the ATU.

13. The network interface controller of claim 9, the ATU further to:
return the untranslated address to the host device by sending, to an address translation service of the host device, a request to perform the address translation for the memory access request.

14. The network interface controller of claim 9, the ATU further to:
determine that a translation for a memory address associated with a memory access request is not available in the cache; and
process the memory access request based on a current operating mode of the ATU.

15. The network interface controller of claim 9, the ATU further to:
determine that a translation for a memory address associated with a memory access request is available in the cache; and
perform the address translation for the memory request based on the translation stored in the cache.

16. A computer system, comprising:
a processor; and
a network interface controller (NIC) comprising an address translation unit (ATU) and a host interface for communicating with a host device,
the ATU storing instructions to:
determine a first number of outstanding address translation requests;
obtain a second number of outstanding read requests tracked by the host interface;
set an operating mode of the address translation unit to a bypass mode based on a combination of the first and second numbers being greater than a first threshold and the first number being greater than a second threshold; and
in response to receiving a memory access request while the bypass mode is set:
refrain from performing address translation for the memory access request; and
return an untranslated address to a host device via the host interface.

17. The computer system of claim 16, the ATU storing instructions further to:
set the operating mode of the address translation unit to a regular mode in response to the first number being greater than the second threshold and less than a third threshold,
receive the memory access request while the regular mode is set; and
perform the address translation for an address associated with the memory access request.

18. The computer system of claim 17, the ATU storing instructions further to:
perform the address translation for the address associated with the memory access request by providing a translation between a virtual memory address and a physical memory address.

19. The computer system of claim 17, the ATU storing instructions further to:
perform the address translation for a virtual address associated with the memory access request by:
determining, based on a selection policy, a set of addresses associated with the virtual address;
pre-fetching address translations for the associated addresses by generating an address translation request for at least the virtual address and the associated addresses; and sending the generated address translation request to an address translation service of the host device.

20. The computer system of claim 19, the selection policy based on at least one of:
- addresses adjacent to the memory address;
- historical data indicating addresses typically accessed after accessing the virtual address; and
- most frequently accessed addresses within a predetermined distance or number of bytes from the virtual address.

\* \* \* \* \*